United States Patent

Mason et al.

[15] 3,661,147

[45] May 9, 1972

[54] PULSE RATE COUNTER AND DISPLAY AND METHOD OF OPERATION

[72] Inventors: William L. Mason, 1630 West Oak Avenue, Fullerton, Calif. 92633; Donald J. Lantz, 1520 Dana Place, Fullerton, Calif. 92631

[22] Filed: Nov. 10, 1969

[21] Appl. No.: 875,285

[52] U.S. Cl. ....................128/2.05 T

[51] Int. Cl. ....................A61b 5/02

[58] Field of Search............128/205 P, 205 R, 205 T, 205 M, 128/206 A, 206 F, 206 R; 307/220, 222; 324/78 D, 78 Z

[56] References Cited

UNITED STATES PATENTS

| | | | |
|---|---|---|---|
| 3,384,075 | 5/1968 | Mitchell | 128/2.06 F |
| 2,492,617 | 12/1949 | Boland et al | 128/2.06 F |
| 3,149,628 | 9/1964 | Bolie | 128/2.05 M |
| 2,815,748 | 12/1957 | Boueke | 128/2.05 T |
| 3,518,983 | 7/1970 | Jorgenson | 128/2.06 A |
| 3,432,687 | 3/1969 | Emmer | 307/220 |
| 3,290,611 | 12/1966 | Hovlacher et al | 307/222 |

*Primary Examiner*—William E. Kamm
*Attorney*—Hinderstein & Silber

[57] ABSTRACT

A pulse rate counter and display applicable for indicating pulse rate of the human body. A counter is advanced at a preset clock rate to measure the time duration between two consecutive pulse beats. Appropriate circuitry determines within which of a group of pulse rate ranges this measured time duration falls. The minimum time per pulse for the determined group is set into the counter and the counter decremented to zero at the preset clock rate. The maximum pulse rate of the group then is preset into the counter and the counter decremented at a selected rate corresponding to the approximate slope of the curve of pulse rate versus time per pulse for the determined group. Decrementing terminates upon occurrence of the third consecutive pulse beat, the contents of the counter then indicating the measured pulse rate.

17 Claims, 10 Drawing Figures

INVENTORS
WILLIAM L. MASON
DONALD J. LANTZ
BY
Hinderstein & Silber
ATTORNEYS

INVENTORS
WILLIAM L. MASON
DONALD J. LANTZ
BY
Hinderstein & Silber
ATTORNEYS

INVENTORS
WILLIAM L. MASON
DONALD J. LANTZ
BY
Hindenstein & Silber
ATTORNEYS

PULSE RATE COUNTER AND DISPLAY AND METHOD OF OPERATION

BACKGROUND OF THE INVENTION

1. Field of the Invention

The present invention relates to a rate counter and display, and more particularly to an apparatus for measuring and indicating pulse rate of the human body.

2. Description of the Prior Art

The pulse of the human body customarily is expressed in terms of beats per minute, this referring to the number of systoles per minute. A systole or systolic heart beat is that period in the functioning of the heart when it is contracting and forcing blood through the arteries, in the course of which the arteries expand. This arterial expansion readily can be sensed with an appropriate pressure transducer situated adjacent the carotid artery of the neck, the volar aspect of the wrist, or other well-known points. Electrical impulses produced by the pressure transducer then may be supplied to appropriate electronic circuitry for determining the systolic pulse rate.

In the past, virtually all electronic pulse rate measurement devices required a relatively long time period to determine the pulse rate of a patient. Typical of such devices is that described in U.S. Pat. No. 2,756,741 to Campanella, wherein a pulse counter is used to count how many systoles occur during a time interval determined by a timing pulse generator. The resultant count, divided by the time interval, is used to control a display matrix which indicates the patient's average pulse rate over the measurement time interval.

Another approach of the prior art is typified by U.S. Pat. No. 2,927,573 to Roepke, U.S. Pat. No. 2,114,578 to Strauss and U.S. Pat. No. 2,801,629 to Edmark. These patents all show pulse rate meters which use systolic pulse beat signals to charge an integrating capacitor over a known period of time. The accumulated charge, as displayed on a meter, is indicative of the pulse rate.

No devices have been available in the past for facilitating pulse rate measurement in a very short period of time. The inventive pulse rate counter and display evaluates the pulse rate of a patient upon sensing three consecutive pulse beats. Accordingly, the time for pulse rate determination is considerably shorter than that of any prior art device. Application of the invention in hospital or other environments thus will reduce the amount of time expended by nurses or other trained personnel in routine measurement of patients' pulse rates. At a time when nurses and other hospital personnel are in short supply, such time saving may be of significant economic consequence.

The present apparatus may be carried from room to room by a nurse, and the pressure sensor manually held against the patient's neck or wrist for the very short period of time required to take the pulse rate reading. Alternatively, the pressure sensor may be taped to the patient and electrically connected to a remote location, possibly at a nurses' station, where the pulse rate counter and display is situated. Such application is particularly useful in intensive care units where the pulse rate of a patient must be checked repetitively at very brief intervals.

SUMMARY OF THE INVENTION

In accordance with the present invention, there is provided a pulse rate counter and display useful for indicating the pulse rate of the human body. The apparatus utilizes a novel system wherein the time duration between occurrence of two consecutive pulse beats is measured by a counter advanced at a preset clock rate. Appropriate circuitry cooperates with the counter and determines to which of a group of pulse rate ranges the measured time duration corresponds. The minimum time per pulse for the determined group is set into the counter and the counter decremented to zero at the preset clock rate. The maximum pulse rate of the group then is preset into the counter, and the counter decremented at a selected rate which corresponds to a linear approximation of the slope of the curve of pulse rate versus time per pulse for the determined group. Decrementing terminates upon occurrence of the third consecutive pulse beat, the contents of the counter then indicating the measured pulse rate.

In a preferred embodiment, a binary-coded-decimal counter is incremented at a one millisecond clock rate, beginning upon detection of the first systolic pulse beat, and terminating upon occurrence of the next pulse beat. The contents of the counter are decoded and used to set one of a group of flip-flops which correspond to the groups of pulse rate ranges. The contents of the counter then are set to the basic group count (i.e. the minimum time per pulse) of the determined group, and the counter decremented at the one millisecond rate. When the decoder senses that the counter has reached zero, the counter is preset to the basic pulse rate count (i.e. the maximum pulse rate) of the selected group, and the counter thereafter decremented at a special clock rate determined by which group flip-flop was set. Decrementing terminates on occurrence of the third consecutive pulse beat, at which time the contents of the counter is displayed to indicate the measured pulse rate.

Thus it is an object of the present invention to provide a novel rate counter and display and method of operation.

Another object of the present invention is a pulse rate measuring apparatus wherein the curve of pulse rate versus time per pulse is linearly approximated.

It is another object of the present invention to provide an apparatus capable of measuring pulse rate in a time interval corresponding to occurrence of three consecutive pulse beats.

Still another object of the present invention is to provide a pulse rate counter and display incorporating means for measuring the time duration between first and second consecutive pulse beats, and means for decrementing a preset counter for a portion of the time between second and third consecutive pulse beats at a rate approximately equal to the slope of the curve of pulse rate versus time per pulse at the intercept corresponding to the measured time duration, the contents of the counter upon occurrence of the third pulse beat indicating the pulse rate.

It is a further object of the present invention to provide a pulse rate counter and display including a counter incremented at a first clock rate between occurrence of two consecutive pulse beats and subsequently decremented from a preset value at a different clock rate depending upon the contents of the counter at the time of occurrence of the second pulse beat.

Still a further object of the present invention is to provide a pulse rate measuring apparatus wherein the curve of pulse rate versus time per pulse is divided into groups, and including a counter preset to a pulse rate relating to one of the groups and decremented at a clock rate corresponding to the linear approximation of the slope of the curve segment associated with that group.

BRIEF DESCRIPTION OF THE DRAWINGS

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures, and wherein.

DESCRIPTION OF THE PREFERRED EMBODIMENT

Figures 1, 2:
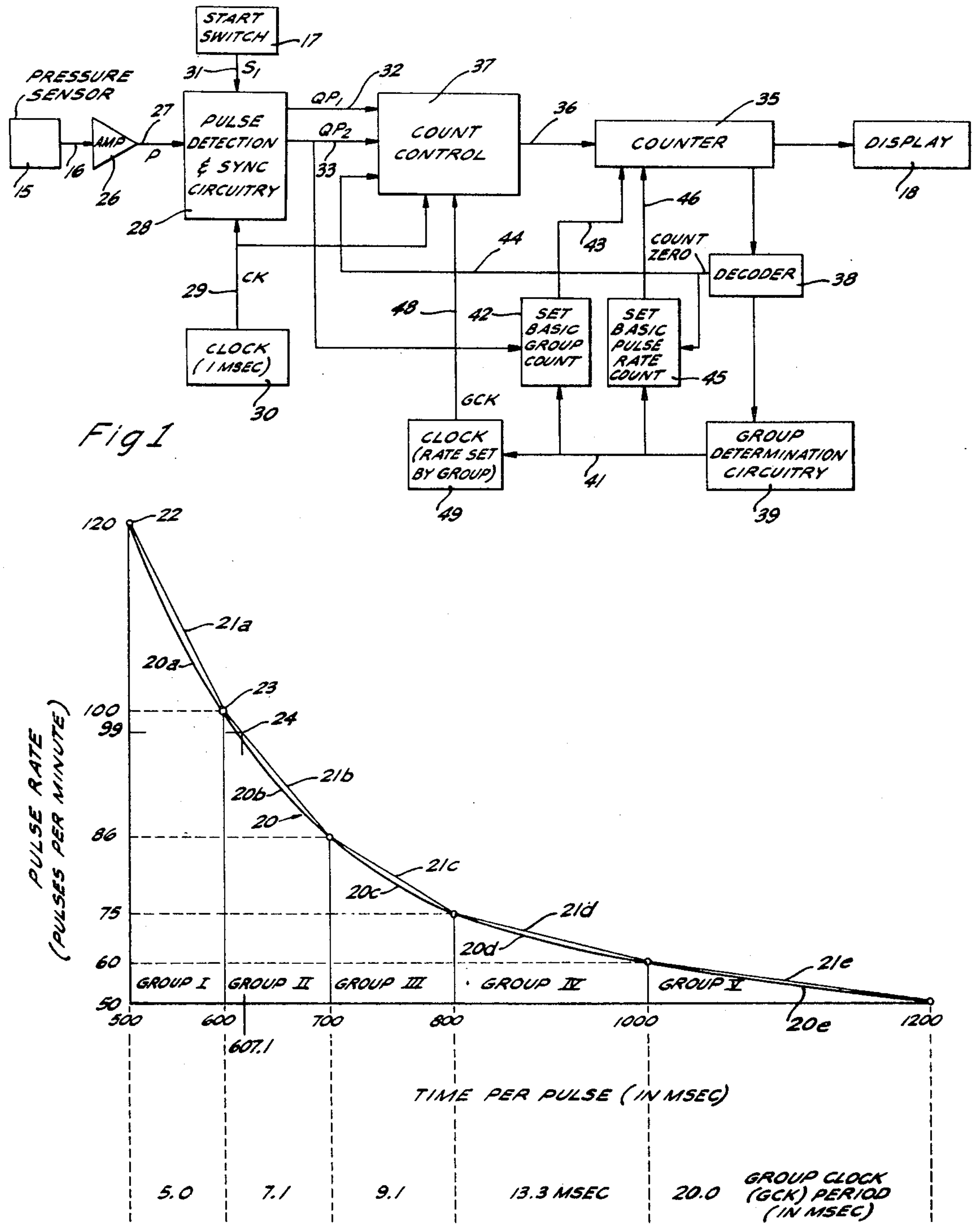
FIG. 1 is an electrical block diagram of a preferred embodiment of the inventive pulse rate counter and display.
FIG. 2 is a graph of pulse rate versus time per pulse, the curve being divided into groups and approximated by linear segments.

Referring now to the drawings, and particularly to FIG. 1 thereof, there is shown a preferred embodiment of the inventive pulse rate counter and display. The apparatus incorporates a conventional pressure sensor 15 which may be attached or held adjacent the carotid artery of the neck, the volar aspect of the wrist or other point on the human body so as to sense the arterial expansion associated with the systolic heart beat. Pressure sensor 15 produces an electrical impulse along a line 16 for each detected pulse beat. When actuated by the closing of a start switch 17, the apparatus of FIG. 1 determines the pulse rate of the impulses present on line 16 and indicates this pulse rate on a display 18.

The inventive pulse rate counter makes use of a linear approximation to the curve of pulse rate versus time per pulse, as shown in FIG. 2. Referring thereto, curve 20 represents pulse rate in pulses per minute as a function of time per pulse in milliseconds (msec). Curve 20 is drawn for the values of pulse rate from 50 pulses per minute (p.p.m.) to 120 pulses per minute, these values encompassing abnormally low, normal, and abnormally high human pulse rates. Curve 20 has been divided arbitrarily into groups of pulse rate ranges herein identified as Group I (100–120); Group II (86–100); Group III (75–86); Group IV (60–75); and Group V (50–60). In other embodiments, curve 20 may extend to higher or lower values of pulse rate, and may be divided into groups having other pulse rate ranges.

Still referring to FIG. 2, the segment of curve 20 associated with each pulse rate group may be approximated by a linear segment. Thus, in FIG. 2, the Group I curve segment **20*a* is approximated by a straight line segment 21*a* extending between points 22 and 23 on curve 20, these points corresponding respectively to pulse rates of 120 and 100. Similarly, curve segment 20*b* corresponding to Group II is approximated by a linear segment 21*b*; and curve segments 20*c*, 20*d*, and 20*e*, corresponding respectively to Groups III, IV and V, are approximated by respective linear segments 21*c*, 21*d* and 21*e***.

It may seem from the curve of FIG. 2, that for a pulse rate of 100 pulses per minute, the time duration between occurrence of two consecutive pulse beats is 600 milliseconds, as indicated by point 23. For a pulse rate of 99 pulses per minute, the time duration between occurrence of two consecutive pulse beats is approximately 607.1 msec, as indicated by intercept point 24 on linear segment **21*b*. Thus, the slope of linear segment 21*b* is approximately 7.1 milliseconds per unit change in pulse rate. This Group II slope value (7.1 msec) is indicated in FIG. 2 and identified as a "group clock (GCK) period." The corresponding linear segment slope or group clock period for each of Groups I through V also is indicated in FIG. 2**.

Referring once again to FIG. 1, the signals P representing heart beats detected by pressure sensor 15 are amplified by an amplifier 26 and provided via a line 27 to pulse detection and sync circuitry 28. Circuitry 28 also receives as an input, along a line 29, a train of clock pulses CK supplied by a clock 30. In the embodiment illustrated, the CK pulses occur at a 1 millisecond rate. However, the invention is not so limited and other CK pulse rates may be employed.

System operation is initialed when start switch 17 is closed, providing a start signal $S_1$ via a line 31 to circuitry 28. Occurrence of the next CK clock pulse after the first pulse beat causes pulse detection and sync circuitry 28 to produce a clock synchronized control signal $QP_1$ on a line 32. This $QP_1$ signal is true until the next consecutive pulse beat is detected by circuitry 28; thereafter, the $QP_1$ signal is false. Pulse detection and sync circuitry 28 also provides a control signal $QP_2$ on a line 33. The $QP_2$ signal initially is false, and so remains until occurrence of the second consecutive pulse beat, at which time the $QP_2$ signal becomes true. The $QP_2$ signal becomes false when the third consecutive pulse beat is detected by pulse detection and sync circuitry 28.

Figure 3:
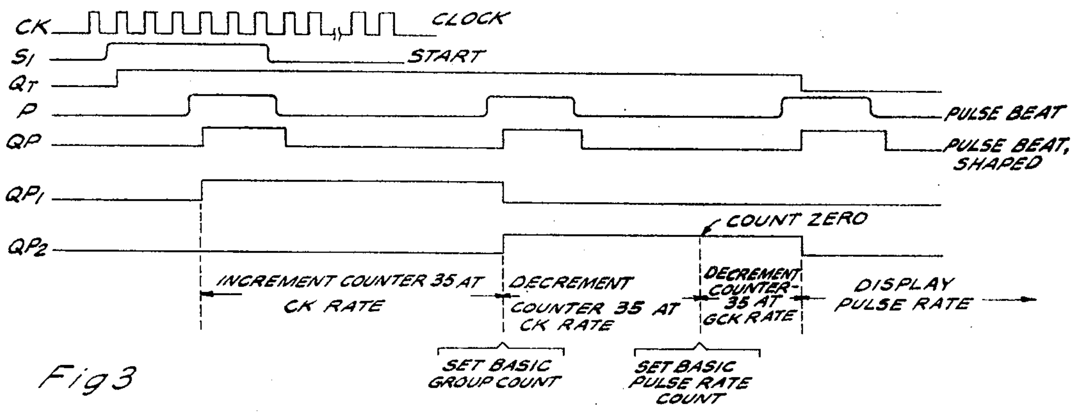
FIG. 3 is a set of wave forms illustrating operation of the apparatus of FIG. 1.

The CK. $S_1$, P, $QP_1$ and $QP_2$ signals associated with operation of pulse detection and sync circuitry 28 are illustrated in FIG. 3. These waveforms will be described in detail hereinbelow in conjunction with FIG. 4.

Referring again to FIG. 1, the inventive pulse rate counter and display includes a conventional counter 35, which may be either incremented or decremented by control pulses provided along a channel 36 from a count control 37. During the time that signal $QP_1$ is true, count control 37 causes counter 35 to increment from zero at a 1 millisecond clock rate by providing along channel 36 the CK clock pulses supplied via line 29 from clock 30. Since the $QP_1$ signal is true between detection of first and second consecutive pulse bears, the contents of counter 35 at the instant that the $QP_1$ signal becomes false will indicate, in milliseconds, the time duration between occurrence of these two pulse beats.

The contents of counter 35 is decoded by a decoder 38 and provided to appropriate group determination circuitry 39, an illustrative embodiment of which is described hereinbelow in conjunction with FIG. 6. Circuitry 39 evaluates the contents of counter 35 at the time the second pulse beat is detected (i.e., when signal $QP_1$ goes false), and determines in which group of pulse rate ranges (see FIG. 2) the measured pulse rate falls. For example, if the contents of counter 35 at the time that signal $QP_1$ goes false is 615, this indicates that the time duration between two consecutive pulse beats is 615 milliseconds (since counter 35 was incremented at a 1 msec rate), and hence the pulse rate lies within Group II (see FIG. 20. Accordingly, group determination circuitry 39 provides along a channel 41 a signal $Q_{II}$ indicative of this determined Group II.

As soon as the signal $QP_1$ goes false, the signal $QP_2$ becomes true. The $QP_2$ signal on line 33 and the determined group signal on line 41 both are supplied to a set basic group count circuit 42 (see FIG. 1), an illustrative embodiment of which is described hereinbelow in conjunction with FIG. 7. Circuit 42 provides a control signal along a channel 43 to reset the contents of counter 35 to the value corresponding to the minimum time per pulse of the determined group. This resetting occurs within one CK clock period after the signal $QP_2$ becomes true. In the illustrative embodiment wherein a signal indicative of Group II is present on line 41, set basic group count circuit 42 sets the contents of counter 35 to the value 600, corresponding to the minimum time per pulse of Group II, as indicated in FIG. 2.

As soon as counter 35 has been reset, this counter begins decrementing at a one msec rate in response to CK clock pulses provided along channel 36 by count control 37. Note that this decrement mode is initiated when count control 37 senses that signal $QP_2$ has become true. Decrementing of counter 35 continues at the CK clock rate until the contents of counter 35 become zero. Occurrence of this zero condition is sensed by decoder 38 which then provides a "count zero" signal to count control 37 along a line 44. Occurrence of the "count zero" signal causes count control 37 to terminate transmission of the CK clock signals, thereby causing counter 35 to stop decrementing.

The "count zero" signal on line 44 (FIG. 1) also is provided to a set basic pulse rate count circuit 45, which circuit also receives as an input the determined group signal on line 41. Upon occurrence of the "count zero" signal, circuit 45 provides a control signal on a channel 46 which causes the contents of counter 35 to be preset to a value corresponding to the maximum pulse rate of the determined group. Thus, in the example wherein the measured pulse rate is within Group II (FIG. 2), circuit 45 causes counter 35 to be preset to the value 100 corresponding to the maximum pulse rate for Group II.

Occurrence of the "count zero" signal also causes count control 37 (FIG. 1) to direct counter 35 to decrement, beginning from the value preset by circuit 45, at a special clock rate in response to GCK clock pulses provided along a line 48 from a clock 49. Clock 49 receives as an input the determined group signal on line 41, and provides GCK clock pulses at a rate set in response to this determined group signal. Specifically, the group clock (GCK) period in milliseconds corresponds to the slope of the linear approximation to the segment of curve 20 (FIG. 2) associated with the determined group. By way of example, if the pulse rate being measured falls within Group II, clock 49 provides group clock (GCK) pulses having a period of 7.1 msec.

Counter 35 is decremented at the GCK clock rate until occurrence of the third consecutive pulse beat. When this third pulse beat is detected by circuitry 28, the $QP_2$ signal goes false and count control 37 terminates transmission of the GCK clock pulses to counter 35. At this time, the contents of counter 35 is numerically equal to the pulse rate of the signal P on line 27. The contents of counter 35 now may be displayed on display 18 to indicate the measured pulse rate.

To summarize the operation of the inventive pulse rate counter and display, between occurrence of first and second pulse beats, the clock synchronized signal $QP_1$ is true. During this interval, counter 35 is incremented at the CK clock rate (1 msec) so that when $QP_1$ goes false, the contents of counter 35 is indicative of the time duration between occurrence of two consecutive pulse beats. This time duration is utilized by group determination circuitry 39 and circuit 42 to reset counter 35 to the minimum time per pulse value associated with the pulse rate range group encompassing the time duration indicated by counter 35. For example, if the time duration between occurrence of first and second consecutive pulse beats was 615 msec, indicating operation in Group II, counter 35 is reset to the value 600.

When the $QP_1$ signal goes false, the $QP_2$ signal goes true (see FIG. 3) and counter 35 is decremented at the CK clock rate until the contents of counter 35 becomes zero. In the example set forth, this decrementing operation will take exactly 600 msec. When the "count zero" condition is sensed, the contents of counter 35 is preset to the maximum pulse rate value for the determined group. In the example, the contents of counter 35 is set to the value 100 (FIG. 2). Counter 35 then is decremented from the preset value at a special clock rate corresponding to the slope of the linear segment of the curve 20 for the determined group. In the example, the group clock (GCK) period is 7.1 millisecond, corresponding to the slope of linear segment 21b for Group II. Decrementing of counter 35 terminates upon occurrence of the third consecutive pulse beat, at which time the $QP_2$ control signal goes false.

Note that the total time during which $QP_2$ is true is approximately the same as the time duration during which signal $QP_1$ was true. Alternatively expressed, the time duration between the second and third pulse beats is approximately the same as the time duration between the first and second consecutive pulse beats. In the example described, this time duration is approximately 615 milliseconds. Recall that counter 35 initially was decremented at the CK rate for a period of 600 milliseconds, beginning when $QP_2$ became true. Thus, there remains a period of 15 milliseconds during which counter 35 is decremented from the preset maximum Group II pulse rate (i.e., from 100) at the GCK clock rate. Since the GCK clock signal has a period of 7.1 milliseconds, two GCK clock pulse will occur before control signal $QP_2$ goes false. The first GCK clock signal will decrement counter 35 from 100 to 99, and the second GCK clock signal will decrement counter 35 from 99 to 98. Thus, upon detection of the third consecutive pulse beat, the contents of counter 35 will be 98, corresponding exactly to the pulse rate being measured.

Figures 4, 5:
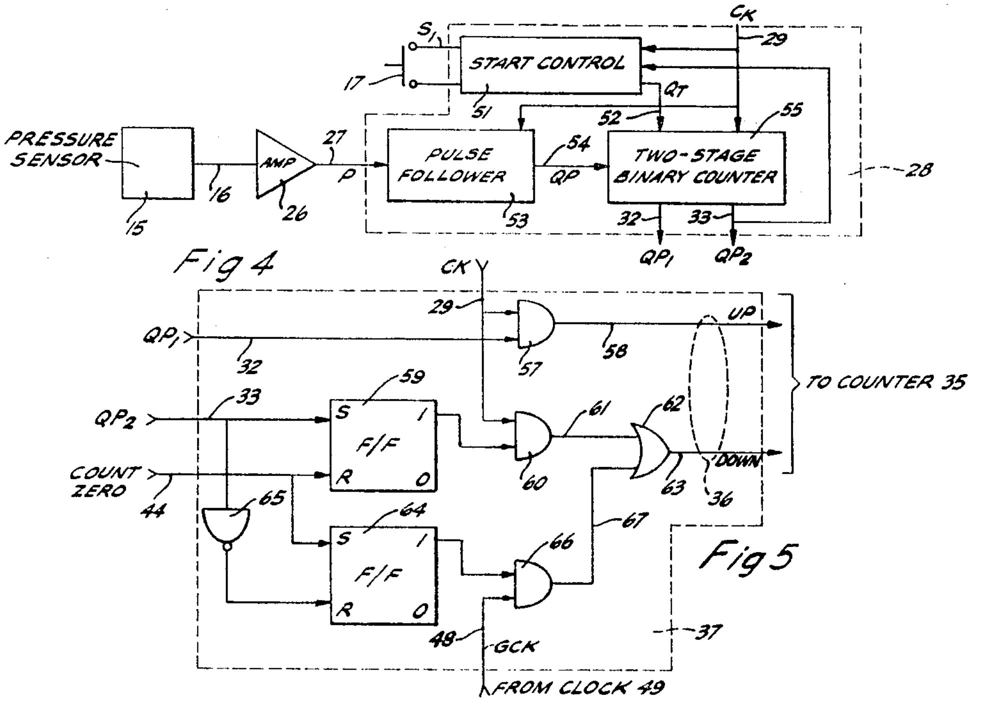
FIG. 4 is an electrical block diagram of a typical embodiment of the pulse detection and sync circuitry also shown in FIG. 1.
FIG. 5 is an electrical schematic diagram of a typical embodiment of the count control segment of the apparatus of FIG. 1.

Referring now to FIG. 4, there is shown a typical embodiment of pulse detection and sync circuitry 28. As indicated therein, circuitry 28 includes a start control circuit 51 which receives as inputs the $S_1$ signal from start switch 17, the CK clock signal on line 29, and the $QP_2$ signal on line 33. Start control 51 provides as an output on a line 52 a clock synchronized signal $Q_T$ which becomes true upon occurrence of the first CK clock pulse following actuation of start switch 17; signal $Q_T$ goes false at the same time that $QP_2$ goes false.

Typically, start control 51 may comprise a flip-flop (not shown) which is set to the true state by the simultaneous occurrence of manual start signal $S_1$ and a CK clock pulse, and which is set false by the true to false transition of the $QP_2$ signal. The true output of such flip-flop then may provide the $Q_T$ signal.

Referring to FIGS. 3 and 4, the amplified signal from pressure sensor 15, identified as signal P on line 27, corresponds to the pulse beat of the person whose pulse rate is being measured. As indicated in FIG. 3, this signal P typically will be out of synchronism with the CK clock signal. Accordingly, the signal P is provided to a conventional pulse follower 53 which also receives as an input the CK clock signal on line 29. Pulse follower 53 provides as an output, on a line 54, a signal QP (FIG. 3) which goes true upon occurrence of the first CK clock pulse following a false to true transition of the signal P. Signal QP goes false upon occurrence of the first CK clock pulse following a true to false transition of the P signal. Thus, QP comprises a clock synchronized pulse beat signal.

The QP signal on line 54 is provided to a two-stage binary counter 55 (FIG. 4) which produces the output signals $QP_1$ and $QP_2$. Binary counter 55 is enabled by the $Q_T$ signal on line 52, is clocked by the CK signal on line 29, and utilizes the QP signal on line 54 as the count input. Signal $QP_1$ may represent the true output of the first binary stage, which stage is true between occurrence of the first and second QP pulses (see FIG. 3); and signal $QP_2$ may represent the true output of the second binary stage, which stage is true between occurrence of the second and third QP pulses. Binary counter 55 is disabled and reset by the $Q_T$ signal subsequent to occurrence of the third QP pulse, since at this time the $Q_T$ signal goes false. Thus, the circuit of FIG. 4 provides all of the functions of pulse detection and sync circuitry 28 shown in FIG. 1.

A typical embodiment of count control 37 (FIG. 1) is illustrated in FIG. 5. Referring thereto, count control 37 incorporates a first AND gate 57 which receives as inputs the CK clock signal on line 29 and the $QP_1$ signal on line 32. During the time that $QP_1$ is true, AND gate 57 is enabled, permitting the CK pulses to be gated through onto a line 58 to the up or increment input to counter 35.

Count control 37 (FIG. 5) also includes a flip-flop 59 which receives as its set input the $QP_2$ signal on line 33. Flip-flop 59 is reset by the "count zero" signal on line 44. The one output of flip-flop 59 provides the enable input to an AND gate 60, which gate also receives as an input the CK clock signal on line 29. The output of AND gate 60, on a line 61, provides one input to an OR gate 62. The output of OR gate 62 is provided via a line 63 to the down or decrement input of counter 35. Note that UP line 58 and DOWN line 63 together comprise channel 36 shown in FIG. 1.

Count control 37 also includes a second flip-flop 64 which is set by the "count zero" signal on line 44. The $QP_2$ signal on line 33 is inverted by an inverter 65 to provide the reset signal for flip-flop 64. The one output of flip-flop 64 provides an enable input to an AND gate 66, which gate receives as a second input the GCK clock signal on line 48. The output of AND gate 66 is provided via a line 67 to OR gate 62.

The operation of count control 37 (FIG. 5) now should be apparent. During the time that the $QP_1$ signal is true (see FIG. 3), AND gate 57 is enabled, permitting CK clock pulses to be gated onto UP line 58, thereby incrementing counter 35. When $QP_1$ goes false, AND gate 57 is disabled to stop the incrementing of counter 35. When $QP_2$ goes true, flip-flop 59 is set to the one state, thereby enabling AND gate 60. With AND gate 60 enabled, CK clock pulses are transmitted via line 61, OR gate 62 and DOWN line 63 to the decrement input of counter 35. Decrementing of counter 35 at the CK clock rate continues until flip-flop 59 is reset to the zero state by occurrence of the "count zero" signal; when this occurs, AND gate 60 is disabled and CK clock pulses no longer are transmitted to line 63.

Occurrence of the "count zero" signal also sets flip-flop 64 to the one state, thereby enabling AND gate 66. At this time, GCK clock pulses from clock 49 are transmitted via AND gate 66, line 67, OR gate 62 and DOWN line 63 to the decrement input of counter 35. Counter 35 thus is decremented at the GCK clock rate until the $QP_2$ signal goes false. When this occurs, the inverted $QP_2$ signal supplied by inverter 65 resets flip-flop 64 to the zero state, thereby disabling AND gate 66 and preventing GCK clock pulses from being transmitted to line 63.

Figure 6:
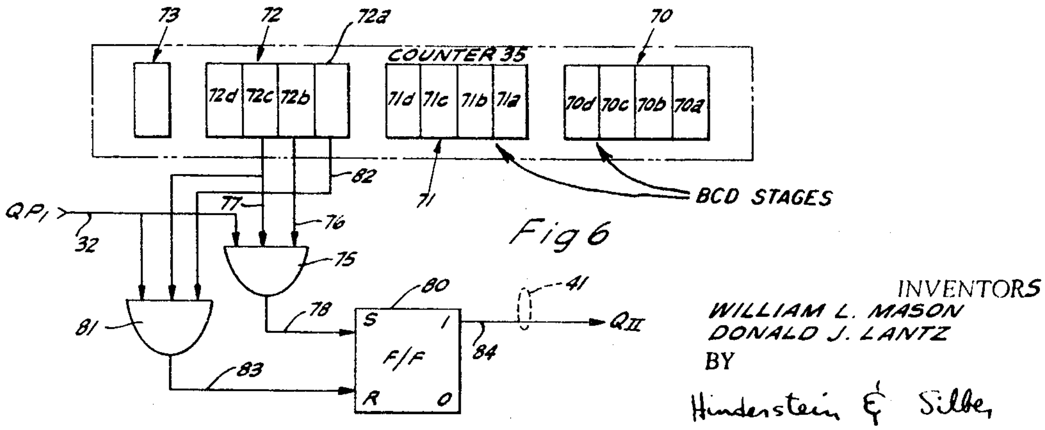
FIG. 6 is an electrical block diagram of a portion of the counter, decoder and group determination circuitry also shown in FIG. 1.

Referring now to FIG. 6, there is shown a typical embodiment of counter 35, a portion of decoder 38 and a portion of group determination circuitry 39. The circuitry shown is appropriate for recognizing when the pulse rate being measured falls within Group II (FIG. 2).

In FIG. 6, binary-coded-decimal (BCD) counter 35 includes BCD stages 70, 71 and 72, which respectively contain units, tens and hundreds decimal digits. A counter stage 73 contains the thousands digit. Counter stage 70 itself comprises four binary stages 70*a*, 70*b*, 70*c* and 70*d*, in order of increasing significance. Similarly, counter stage 71 includes binary stages 71*a*, 71*b*, 71*c* and 71*d*, and counter stage 72 includes binary stages 72*a*, 72*b*, 72*c* and 72*d*, in order of increasing significance. Counter stage 73 comprises a single binary stage.

Any decimal number between zero and 1,999 may be represented by the states of the binary stages of counter 35. By way of example, the decimal number 1,009 may be stored in counter 35 by setting binary stages 73, 70*d* and 70*a* to 1, and setting all other stages of counter 35 to zero. (The binary contents of counter 35 then would be 1 0000 0000 1001.)

In the embodiment of FIGS. 6, decoder 38 comprises a first three-input AND gate 75 which receives as an enable input the $QP_1$ signal on line 32. AND gate 75 also receives as inputs the true outputs of counter stages 72*b* and 72*c*, along respective lines 76 and 77. AND gate 75 provides an output on a line 78 to the set input of a flip-flop 80 which is associated with pulse rate Group II and which is part of group determination circuitry 39.

Still referring to FIG. 6, a second three input AND gate 81, also a portion of decoder 38, receives as an enabling input the $QP_1$ signal on line 32. AND gate 81 also receives as inputs the true outputs of counter stages 72*a* and 72*c*, on respective lines 82 and 77. The output of AND gate 81 is supplied via a line 83 to the reset input of flip-flop 80. The one output of flip-flop 80 herein is identified as the $Q_{II}$ signal, and is provided on a line 84 which forms a portion of channel 41 (see FIG. 1).

Operation of the circuitry of FIG. 6 now should be apparent. During the time that $QP_1$ is true (see FIG. 3), counter 35 is incremented at the CK rate. Also during this time, AND gate 75 and 81 are both enabled. If the pulse rate being measured lies within Group II, the contents of counter 35 gradually will increase until a count of 600 is reached. At this time, counter stages 72*b* and 72*c* both will go true and AND gate 75 will provide an output on line 78 to set flip-flop 80 to the one state.

At the time of occurrence of the second pulse beat, when $QP_1$ goes false, the contents of counter 35 will not yet have reached 700 (because the pulse rate is within Group II) and hence counter stages 72*a* and 72*c* will not simultaneously have become true. Accordingly, during the time that $QP_1$ was true, no reset signal would have been produced on line 83. Thus, when $QP_1$ goes false, flip-flop 80 will be set to the one state and a true $Q_{II}$ signal will be present on channel 41, indicating that the pulse rate being measured lies within Group II.

It will be understood that group determination circuitry 39 also includes other flip-flops (not shown) which are set and reset by appropriate circuitry (not shown) in decoder 38 so as to indicate that the pulse rate being measured lies within a group other than Group II. In this regard, should the pulse rate being measured lie within one of GROUPS III, IV OR V, during the time that $QP_1$ is true, counter 35 (see FIG. 6) will count through a count of 600, thereby setting flip-flop 80. However, while $QP_1$ still is true, the count in counter 35 will increase past 700, at which time stages 72*a* and 72*c* simultaneously will be true and an output signal will be provided from AND gate 81. This output signal on line 83 will reset flip-flop 80 to the zero state. Thus, when $QP_1$ goes false, flip-flop 80 will be in the zero state and the $Q_{II}$ signal will be false. Of course, at this time the output of another flip-flop (not shown) in group determination circuitry 39 will be true, providing an appropriate signal on channel 41 indicative of the determined pulse rate group.

As discussed hereinabove in conjunction with FIG. 1, the determined group signal on channel 41 is utilized during the period that $QP_2$ is true. At this time, the $QP_1$ signal is false, so that no set or reset signals are provided to flip-flop 80 (FIG. 6) or to the other flip-flops (not shown) in group determination circuitry 39. Accordingly, the determined group signal on line 41 remains present throughout the time that $QP_2$ is true. Although not shown, appropriate reset circuitry may be provided to reset all of the flip-flops in group determination circuitry 39 to zero at the time that the $Q_T$ signal (FIG. 3) goes false at the end of the measurement cycle.

Figure 7:
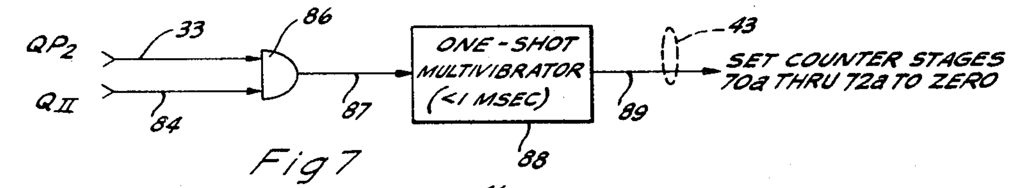
FIG. 7 is an electrical block diagram of part of the "set basic group count" segment of the apparatus of FIG. 1.

An illustrative embodiment of a portion of set basic group count circuit 42 is shown in FIG. 7. As discussed hereinabove, circuit 42 is used to set the contents of counter 35 to the minimum time per pulse associated with the determined pulse rate group. Thus, in the illustrative example wherein the measured pulse rate falls within Group II (FIG. 2) as soon as the $QP_2$ signal goes true, set basic group count circuit 42 causes the contents of counter 35 to be set to 600.

To accomplish this, circuit 42 includes an AND gate 86 (FIG. 7) which receives as inputs the $QP_2$ signal on line 33 and the $Q_{II}$ signal on line 84. When these signals both are true, AND gate 86 provides an output on a line 87 to a one-shot multivibrator 88. In a preferred embodiment, the period of one-shot 88 is less than one millisecond, so that the output signal provided on a line 89 is present for less than one cycle of the CK clock. Line 89, which forms a portion of channel 43 (FIG. 1), is appropriately connected to counter 35, in a manner well known to those skilled in the art, so that a signal occurring on line 89 will set counter stages 70*a* through 72*a* (i.e., all binary stages of lesser significance than counter stage 72*b*) to zero.

The operation of the circuitry of FIG. 7 readily may be understood. As soon as the $QP_2$ signal goes true (FIG. 3) a signal will be present on channel 41 indicating the determined pulse rate group. If the measured pulse rate lies within Group II, the $Q_{II}$ signal on line 84 will be true. In this case, as soon as $QP_2$ goes true, an output will appear from AND gate 86 to initiate operation of one-shot multivibrator 88. Accordingly, a signal of less than one millisecond duration will be provided on line 89 which will set counter stages 70*a* through 72*a* to zero prior to occurrence of the next CK clock signal. Since counter stages 72*b* and 72*c* both were set to one at the time that $QP_2$ became true (a condition necessary for occurrence of the $Q_{II}$ signal, as discussed in conjunction with FIG. 6 above), the signal on line 89 thus effectively will set the contents of counter 35 to 600. This set basic group count operation will occur prior to counter 35 being decremented at the CK clock rate.

Note that the circuitry of FIG. 7 represents only a portion of set basic group count circuit 42. Circuit 42 also will include a unit similar to that shown in FIG. 7 for each of the other pulse rate Groups I, III, IV and V.

Figure 8:
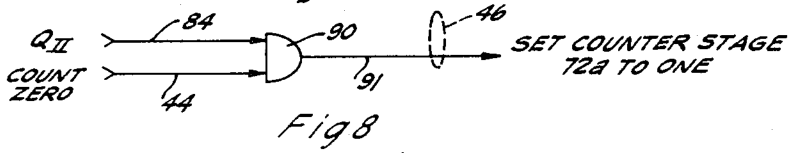
FIG. 8 is an electrical block diagram of part of the "set basic pulse rate count" segment of the apparatus of FIG. 1.

Recall that as soon as counter 35 is decremented to zero (i.e., upon occurrence of the "count zero" signal) set basic pulse rate count circuit 45 causes the contents of counter 35 to be set to a number corresponding to the maximum pulse rate of the determined group. FIG. 8 illustrates a typical embodiment of a portion of circuit 45, useful for setting the contents of counter 35 to the number 100, corresponding to the maximum pulse rate for Group II.

The circuitry of FIG. 8 includes an AND gate 90 which receives as inputs the "count zero" signal on line 44 and the $Q_{II}$ signal on line 84. The output of AND gate 90, on a line 91 which forms a portion of channel 46, is used to set counter stage 72a to one. Since all of the other counter stages are zero (a prerequisite of the "count zero" condition), occurrence of the signal on line 91 sets the contents of counter 35 to 100. Of course, when the counter has been so set, the "count zero" signal goes false, terminating operation of circuit 45. Again, note that circuit 45 (FIG. 1) will include a unit corresponding to that of FIG. 8 for each of the other pulse rate Groups I, III, IV and V.

Figure 9:
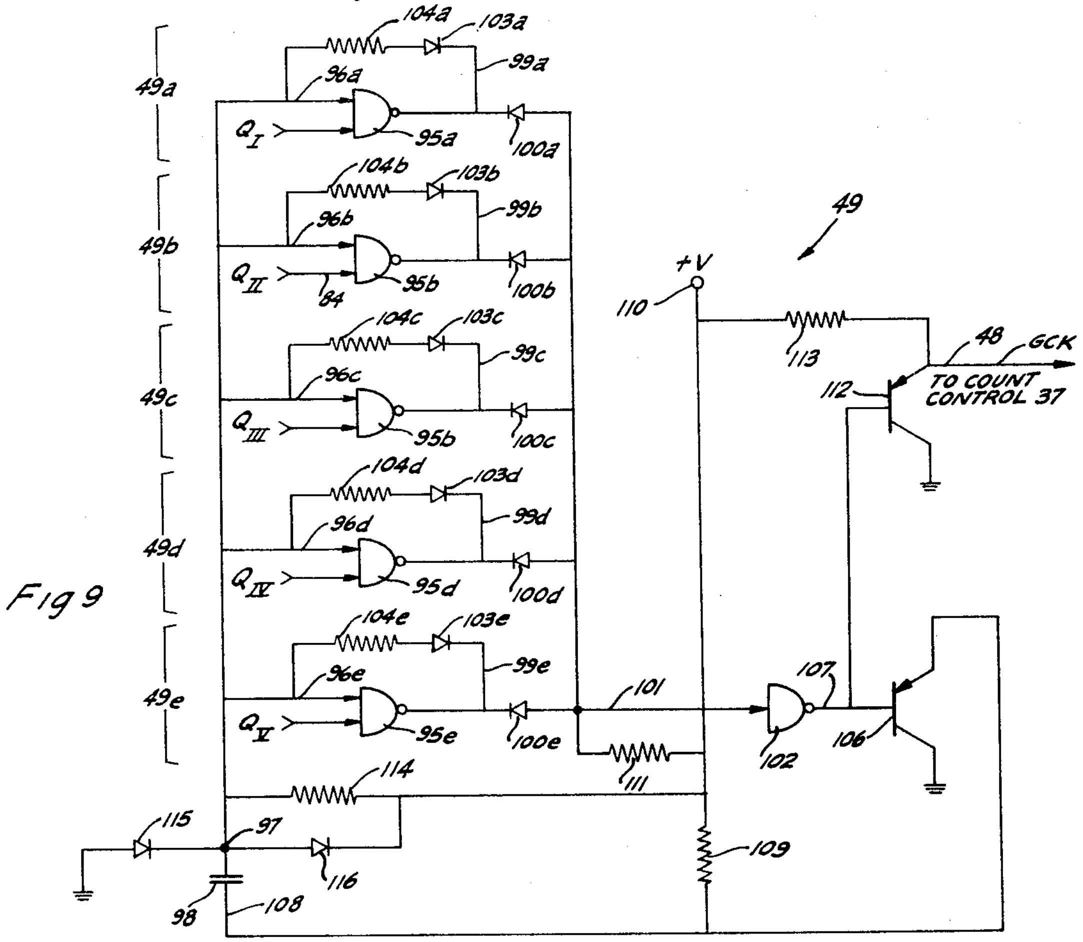
FIG. 9 is an electrical schematic diagram of a typical embodiment of the "group clock" segment of the apparatus of FIG. 1.

A typical embodiment of clock 49 (FIG. 1) shown in FIG. 9. In the embodiment illustrated, clock 49 includes five similar circuits 49*a*, 49*b*, 49*c*, 49*d*, and 49*e*, associated respectively with pulse rate Groups I through V. Thus, if the signal on channel 41 (FIG. 1) indicates that the pulse rate being measured lies within Group I, a signal $Q_I$ will be provided to enable circuit 49*a*. Similarly, if the measured pulse rate lies within a respective one of Groups II, III, IV and V, a respective signal $Q_{II}$, $Q_{III}$, $Q_{IV}$ or $Q_V$ will be provided to enable the corresponding one of circuits 49*b* to 49*e*.

Typical circuit 49*a* includes a two-input NAND gate 95a which receives as an enable input the $Q_I$ signal. The other input 96*a* of NAND gate 95*a* is connected to a first terminal 97 of a capacitor 98 which is common to all of circuits 49*a*–49*b*[. The output of NAND gate 95*a* is directed via a line 99*a* and a diode 100a to the input 101 of an inverter 102; inverter 102 is common to all of circuits 49*a*–49*e*. The output of NAND gate 95*a* also is directed via a diode 103*a* and a resistor 104*a* back to NAND gate input terminal 96*a*.

Each of circuits 49*b*–49*e* is similar to circuit 49*a*, and each includes a NAND gate 95*b*–95*e*, the output of which is directed via a respective line 99*b*–99*e* and diode 100*b* - 100*e* to input 101 of inverter 102. Circuits 49*b*–49*e* each also contain a respective diode 103*b* - 103*e* series connected with a resistor 104*b*–104*e* between the output of respective NAND gate 95*b*–95*e* and the corresponding input terminal 96*b*–96*e*. The $Q_{II}$ through $Q_V$ signals respectively enable NAND gates 95*b*–95.

Clock 49 also includes a first PNP transistor 106 (FIG. 9), the base of which receives, via a line 107, the output of inverter 102. The emitter of transistor 106 is connected directly to the second terminal 108 of capacitor 98, and via a resistor 109 to a source of +V voltage provided via a terminal 110. The collector of transistor 106 is connected to ground. Note that the input 101 to inverter 102 also is connected to +V terminal 110 via a resistor 111.

The base of a second PNP transistor 112 also receives the output of inverter 102 via line 107. The collector of transistor 112 is connected to ground, and the emitter of transistor 112 is connected via a resistor 113 to +V terminal 110. The emitter of transistor 112 also provides the output from clock 49 via line 48.

Still referring to FIG. 9, terminal 97 of capacitor 98 also is connected via a resistor 114 to +V terminal 110, via a first diode 115 to ground and via a second diode 116 to +V terminal 110. Diodes 115 and 116 respectively prevent the voltage at terminal 97 from going below ground or above +V potential.

In the operation of clock 49, a true signal is represented by a +V potential, and a false signal represented by ground potential. Thus, when all of signals $Q_I$ through $Q_V$ are false, the output of each of NAND gates 95*a* through 95*e* will be true, that is, at +V potential. With each of lines 99*a* through 99*e* at +V potential, input 101 to inverter 102 is also maintained at +V potential via resistor 111. Accordingly, the output of inverter 102 is false (i.e., at ground potential) and transistors 106 and 112 both are on.

Since transistor 106 is conducting, terminal 108 of capacitor 98 is held at ground potential. Terminal 97 is at +V potential, capacitor 98 being charged to this potential via a current path from terminal 110 through resistor 114 to terminal 97. Since transistor 112 also is on, output line 48 is at ground potential and no GCK clock pulses are provided when signal $Q_I$ through $Q_V$ all are false.

By way of example, when signal $Q_{II}$ on line 84 goes true, indicating that the pulse rate being measured lies within Group II, both inputs to NAND gate 95*b* (FIG. 9) become true. Recall that input 96*b* is true since terminal 97 is at +V potential as a result of the charge on capacitor 98. In this situation, the output of NAND gate 95*b* goes false, driving line 99*b* to ground potential (i.e., false).

When line 99*b* goes false, input terminal 101 of inverter 102 also goes false, a current path now being provided from terminal 110 via resistor 111 and diode 100*b* to grounded line 99*b*. As a result, the output of inverter 102 goes true, turning off both transistors 106 and 112, and causing the output GCK signal on line 48 to go true.

Recall that before signal $Q_{II}$ went true, terminal 97 of capacitor 98 was at +V potential and terminal 108 was at ground. With signal $Q_{II}$ true, as soon as line 99*b* goes false, a current path is established from terminal 97 via resistor 104*b* and diode 103*b* to grounded line 99*b*. This causes the voltage at terminal 97 to drop toward ground potential. At the same time because transistor 106 is cut off, terminal 108 rises toward the +V potential supplied via terminal 110 and resistor 109.

Eventually, at a rate determined by the RC time constant of resistor 104*b* and capacitor 98, the voltage at terminal 97 will reach ground potential, thereby providing a false signal on input line 96*b* of NAND gate 95*b*. When this occurs, the output of NAND gate 95*b* will go true, driving line 99*b* to +V potential and causing the input signal on line 101 to inverter 102 to become true. As a result, the output of inverter 102 will go false, turning on transistors 106 and 112 and causing the GCK signal on line 48 to go false.

When the output of inverter 102 goes false, transistor 106 conducts, and terminal 108 of capacitor 98 again is connected to ground. Since line 99*b* is at +V potential, terminal 97 is free to rise to this voltage level, a current path being provided from terminal 110 through resistor 114 to capacitor 98. As soon as terminal 97 reaches the +V level, a true input again is provided on line 96*b* to NAND gate 95*b* and the cycle begins again.

It is apparent from the foregoing description that with a true signal $Q_{II}$ applied on line 84, clock 49 and circuit 49*b* will oscillate and thereby provide periodic GCK clock pulses on line 48 with a period determined by the values of resistor 104*b* and capacitor 98. In a manner well known to those skilled in the art, the values of resistor 104*b* and capacitor 98 are selected so that the clock period of the GCK pulses correspond to the value of 7.1 milliseconds, set forth for Group II in FIG. 2.

It is apparent that if the pulse rate being measured falls within another of Groups I through V, $Q_{II}$ will remain false and the corresponding one of signals $Q_I$, $Q_{III}$, $Q_{IV}$ and $Q_V$ will go true. Accordingly, the corresponding one of circuits 49*a*, 49*c*, 49*d* and 49*e* will be operative in clock 49. The resultant rate at which GCK clock pulses are produced will depend on the value of the resistor 104*a*, 104*c*, 104*d* or 104*e* in the operative circuit. The values of these resistors 104*a*, 104*c*, 104*d* and 104*e* thus are selected so that together with capacitor 98, they will produce GCK clock pulses at the respective periods for Groups I, III, IV and V as set forth in FIG. 2 hereinabove.

From the description of the invention pulse rate counter and display illustrated in FIG. 1, it is apparent that counter 35 does not contain the measured pulse rate until after the $QP_2$ signal has gone false (FIG. 3) upon detection of the third consecutive pulse beat. Accordingly, it is desirable that the contents of counter 35 only be displayed after occurrence of this third pulse beat. The circuit of FIG. 10 accomplishes this result.

Figure 10:
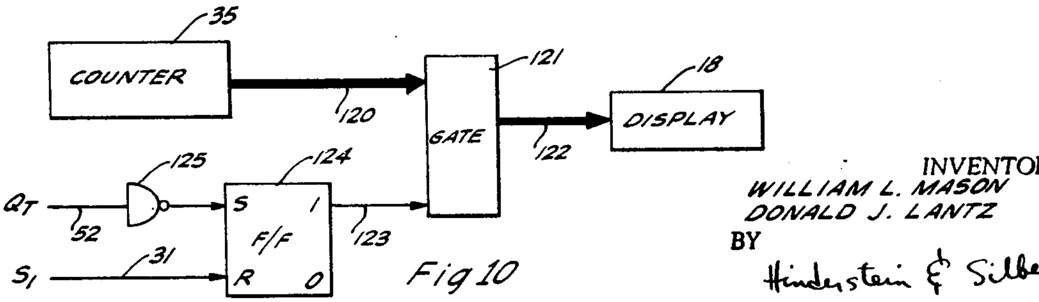
FIG. 10 is an electrical block diagram showing a typical embodiment of the inter-connections between the counter and display segments of the apparatus of FIG. 1.

As shown in FIG. 10, the contents of counter 35 are provided to display 18 via a channel 120, a gate 121 and a channel 122. Gate 121 is enabled by a signal provided via a line 123 from the one output of a flip-flop 124. The $Q_T$ signal (FIG. 3) on line 52 is inverted by an inverter 125, the output of which is connected to the set input of flip-flop 124. The $S_1$ signal on line 31 is connected to the reset terminal of flip-flop 124.

In operation, when start switch 17 is actuated, the resultant $S_1$ signal resets flip-flop 124 to the zero state. This disables gate 121, and prevents the contents of counter 35 from being transmitted to display 18 during the time that the apparatus of FIG. 1 is determining the pulse rate. Upon occurrence of the third consecutive pulse beat, the $Q_T$ signal goes false and the output of inverter 125 (FIG. 10) goes true, thereby setting flip-flop 124 to the true state. As a result, gate 121 is enabled, permitting display 18 to indicate the contents of counter 35 which now correspond to the measured pulse rate.

While the inventive pulse rate counter and display has been described with reference to its use for measurement of human pulse rate, the invention clearly is not so limited. Thus, the circuitry of FIG. 1 could be used to measure and display the pulse rate of any train of pulses P provided on line 27 (FIG. 1) regardless of the source of the pulse train. In this regard, the various pulse rate ranges encompassed by the curve of FIG. 2 are purely illustrative, and different pulse rate ranges may be employed for different applications.

Similarly, the circuitry of FIGS. 4 through 10 is illustrative only, and various other logic circuit arrangements well known to those skilled in the art may be employed for the various components of the pulse rate counter and display of FIG. 1. By way of example, clock 49 may comprise a set of oscillators completely different in configuration from that shown in FIG. 9, or may comprise a single oscillator (not shown) the frequency determining elements of which may be controlled in response to the particular signal provided along channel 41.

While the invention has been described with respect to several physical embodiments constructed in accordance therewith, it will be apparent to those skilled in the art that various modifications and improvements may be made without departing from the scope and spirit of the invention. For example, whereas the present invention has been described with reference to apparatus for measuring and indicating pulse rate of the human body, it will be obvious to those skilled in the art that the present system is equally applicable for measuring and indicating the rate of any train of periodically occurring stimuli. Accordingly, it is to be understood that the invention is not to be limited by the specific illustrative embodiment, but only by the scope of the appended claims.

We claim:

1. A pulse rate determination system comprising:

means for detecting the occurrence of pulse beats, means responsive to said detecting means for measuring the time between occurrence of first and second consecutive pulse beats, a counter, means responsive to said measuring means for presetting the contents of said counter so that after some time interval starting with the occurrence of said second consecutive pulse beat, said counter contains a value indicative of the pulse rate corresponding to a time spacing between consecutive pulse beats equal to said time interval, said pulse rate also corresponding to the maximum pulse rate of a range of pulse rates including the rate corresponding to said measured time between said first and second consecutive pulse beats, and means operative upon the termination of said time interval for decrementing said counter at a rate equal to a linear approximation of the relationship between pulse rate and time spacing for said range of pulse rates whereby the contents of said counter upon occurrence of a third consecutive pulse beat is indicative of said pulse rate.

2. A system as defined in claim 1, further comprising:

means for measuring a period of time beginning upon occurrence of said second consecutive pulse beat and equal in duration to the minimum time spacing between consecutive pulse beats for said maximum pulse rate of said range of pulse rates, said decrementing of said counter beginning at the end of said period of time.

3. Apparatus for measuring pulse rate, said apparatus comprising:

pulse detection means for detecting occurrence of pulse beats, a counter, means responsive to said pulse detection means for incrementing said counter at a first clock rate between occurrence of first and second consecutive pulse beats, the contents of said counter upon occurrence of said second pulse beat being within one of a group of time per pulse ranges, means, operative upon occurrence of said second pulse beat, for setting said counter to the minimum time per pulse value of said one group, first means for decrementing said counter at said first clock rate, said decrementing beginning upon occurrence of said second pulse beat and terminating when the contents of said counter reach zero, means, operative when said counter is decremented to zero, for presetting said counter to the pulse rate value associated with said maximum pulse rate of said one group, and second means for decrementing said counter at a second clock rate associated with said one group, beginning when said counter is preset and terminating upon occurrence of the third consecutive pulse beat.

4. Apparatus as defined in claim 3 further comprising:

means for displaying the contents of said counter subsequent to occurrence of said third consecutive pulse beat.

5. Apparatus as defined in claim 3 wherein said means for incrementing comprises:

a first clock producing a first train of pulses at said first clock rate, and first gate means operatively connected to said pulse detection means for gating said first train of pulse to said counter beginning when said pulse detection means detects said first pulse beat and terminating when said pulse detection means detects said second pulse beat.

6. Apparatus as defined in claim 5 wherein said pulse detection means comprises:

a pressure sensor adapted to be positioned adjacent a portion of a human body, said pressure sensor providing an input to said first gate means in response to occurrence of a heart beat of said human.

7. Apparatus as defined in claim 5 wherein said first means for decrementing comprises:

second gate means operatively connected to said pulse detection means for gating said first train of pulses to said counter beginning when said pulse detection means detects said second pulse beat.

8. Apparatus as defined in claim 7 further comprising:

means, cooperating with said counter, for producing a "-count zero" signal when the contents of said counter is zero, and means for terminating operation of said second gate means upon occurrence of said "count zero" signal.

9. Apparatus as defined in claim 8 wherein said second means for decrementing comprises:

a second clock operative to produce a second train of pulses at a selectable one of a set of clock rates, means, cooperating with said second clock, for selecting one of said sets of clock rates in accordance with the contents of said counter at the time of occurrence of said second pulse beat, said selected one corresponding to said second clock rate, and third gate means operatively connected to said pulse detection means for gating said second train of pulses to said counter beginning when said counter is preset and terminating when said pulse detection means detects said third pulse beat.

10. Apparatus for determining the rate of a train of periodically occurring stimuli comprising:

means for detecting the occurrence of individual ones of said stimuli;

a counter;

means responsive to said detecting means for presetting the contents of said counter so that after some time interval starting with the occurrence of one of said stimuli, said counter contains a value indicative of the rate corresponding to a time spacing between consecutive stimuli equal to said time interval, said rate also corresponding to the maximum rate of a range of rates; and means operative upon the termination of said time interval for decrementing said counter at a rate equal to a linear approximation of the relationship between rate and time spacing for said range of rates whereby the contents of said counter indicates the rate of said stimuli within said range of rates.

11. Apparatus according to claim 10 further comprising:

means responsive to said detecting means for terminating said decrementing of said counter upon the occurrence of the next consecutive one of said stimuli.

12. Apparatus according to claim 11 further comprising:

means for terminating said decrementing of said counter at said linear approximation rate when said counter reaches a value corresponding to the minimum rate of said range of rates.

13. Apparatus according to claim 11 further comprising:

means, operative when said counter reaches a value corresponding to the minimum rate of said range of rates, said minimum rate also corresponding to the maximum rate of a second, lower range of rates, for decrementing said counter at a rate equal to a linear approximation of the relationship between rate and time spacing for said second range of rates whereby the contents of said counter indicates the rate of said stimuli within a plurality of ranges of rates.

14. Apparatus according to claim 10 wherein said train of periodically occurring stimuli comprises a train of heart pulse beats and wherein said detecting means comprises:

means for detecting the occurrence of individual pulse beats.

15. A method for determining the instantaneous rate of a train of periodically occurring stimuli comprising the steps of:

dividing the non-linear relationship between rate and time spacing between consecutive stimuli into a series of linear segments;

presetting the contents of a counter to a rate value which, upon termination of a certain time interval starting with the occurrence of one of said stimuli, corresponds to a time spacing between consecutive stimuli equal to said time interval, said rate value also corresponding to the maximum rate value of one of said linear segments; and decrementing said counter, upon termination of said time interval, at a rate equal to the slope of said one of said linear segments whereby the contents of said counter indicates the instantaneous rate of said stimuli within said one of said linear segments.

16. A method according to claim 15 further comprising the step of:

terminating said decrementing of said counter upon the occurrence of the next consecutive one of said stimuli.

17. A method according to claim 16 further comprising the step of:

changing the rate at which said counter is decremented as the count therein passes from one linear segment to the next linear segment, the rate for each segment being equal to the slope thereof.

* * * * *